United States Patent
Wang et al.

(10) Patent No.: US 12,073,490 B2
(45) Date of Patent: Aug. 27, 2024

(54) PROCESSING SYSTEM THAT INCREASES THE CAPACITY OF A VERY FAST MEMORY

(71) Applicant: Alibaba Damo (Hangzhou) Technology Co., Ltd., Hangzhou (CN)

(72) Inventors: Yuhao Wang, Hangzhou (CN); Dimin Niu, Hangzhou (CN); Yijin Guan, Hangzhou (CN); Shengcheng Wang, Hangzhou (CN); Shuangchen Li, Hangzhou (CN); Hongzhong Zheng, Hangzhou (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 99 days.

(21) Appl. No.: 17/581,774

(22) Filed: Jan. 21, 2022

(65) Prior Publication Data
US 2023/0088939 A1    Mar. 23, 2023

(30) Foreign Application Priority Data
Sep. 18, 2021   (CN) .......................... 202111098487.8

(51) Int. Cl.
*G06T 1/20*     (2006.01)
*G06T 1/60*     (2006.01)

(52) U.S. Cl.
CPC . *G06T 1/60* (2013.01); *G06T 1/20* (2013.01)

(58) Field of Classification Search
CPC .............. Y02D 10/00; G06T 1/20; G06T 1/60
USPC ......................................... 345/501, 531, 538
See application file for complete search history.

(56) References Cited

U.S. PATENT DOCUMENTS

| | | | |
|---|---|---|---|
| 10,282,811 B2 | 5/2019 | Ray et al. | |
| 10,650,483 B2 | 5/2020 | Ray et al. | |
| 10,795,817 B2 | 10/2020 | Keymolen et al. | |
| 11,030,126 B2 | 6/2021 | Koufaty et al. | |
| 11,188,471 B2 | 11/2021 | Duan et al. | |
| 11,232,622 B2 | 1/2022 | Salah et al. | |
| 11,282,161 B2 | 3/2022 | Ray et al. | |
| 11,599,376 B1 | 3/2023 | Viswanathan et al. | |
| 2010/0321397 A1 | 12/2010 | Ginzburg | |
| 2016/0085685 A1 | 3/2016 | Topp et al. | |
| 2017/0337136 A1 | 11/2017 | Basu et al. | |
| 2018/0181341 A1 | 6/2018 | Blinzer | |
| 2018/0308216 A1* | 10/2018 | Mirza | G06F 13/24 |
| 2020/0201573 A1* | 6/2020 | Kwak | G06F 3/0649 |
| 2022/0122215 A1* | 4/2022 | Ray | G06F 9/3001 |
| 2022/0277412 A1 | 9/2022 | Ray et al. | |

* cited by examiner

Primary Examiner — Jacinta M Crawford (57) ABSTRACT

The maximum capacity of a very fast memory in a system that requires very fast memory access times is increased by adding a memory with remote access times that are slower than required, and then moving infrequently accessed data from the memory with the very fast access times to the memory with the slow access times.

20 Claims, 4 Drawing Sheets

PROCESSING SYSTEM THAT INCREASES THE CAPACITY OF A VERY FAST MEMORY

CROSS-REFERENCE TO RELATED APPLICATIONS

This application claims priority to Chinese Patent Application No. 202111098487.8, filed on Sep. 18, 2021, which is incorporated herein by reference in its entirety.

BACKGROUND OF THE INVENTION

1. Field of the Invention

The present invention relates to a processing system and, more particularly, to a processing system that increases the capacity of a very fast memory.

2. Description of the Related Art

A graphics processing unit (GPU) is a well-known device that performs the computations necessary to populate a frame buffer which, in turn, is used to display an image on a screen. A central processing unit (CPU) offloads the task of populating the frame buffer, which can be computationally intensive, to the GPU, thereby freeing the CPU to perform other tasks in a timely manner.

A general-purpose graphics processing unit (GPGPU) is an extension of a GPU in that a GPGPU can be programmed to perform other computationally-intensive (non-graphics processing) operations. In artificial intelligence (AI) and machine learning applications, a CPU is often paired with a number of GPGPUs, e.g., 100 GPGPUs, that perform convolution type operations in parallel.

A GPGPU has a processor and a memory that is coupled to the processor. In many AI and machine learning applications, the memory has to be large and very fast. As a result, the memory in a GPGPU in an AI/machine learning setting is commonly implemented with a large and very fast memory known as a high bandwidth memory (HBM).

A typical HBM includes a number of dynamic random-access memory (DRAM) dies that are vertically stacked on top of each other to provide a large storage capacity, e.g., 4 GB, 24 GB, and 64 GB, with a small form factor. In addition, each DRAM die includes two 128-bit data channels to provide a high bandwidth.

One problem with current-generation GPGPUs is that the GPGPU memory (HBM) effectively has a maximum capacity which, in turn, limits the operations that the GPGPU can perform in a timely manner. A maximum capacity effectively exists because it is increasingly more difficult to vertically stack dies on top of each other, thereby effectively limiting both the number of dies that can be stacked up to form an HBM and the maximum capacity of the HBM. In addition, each die in an HBM is often fabricated with the largest reticle, which limits the maximum size and capacity of the die.

Further, in addition to an effective maximum capacity, all or a portion of another memory, such as a portion of the CPU memory, cannot be used as an extension of the GPGPU memory (HBM) to provide additional very fast memory capacity. This is because the GPGPU would be coupled to the extension (e.g., CPU) memory by way of a peripheral component interconnect express (PCIe) bus. Accessing data across a PCIe bus can be 100 times slower than accessing the data in an HBM, which is far too slow for some AI/machine learning applications.

Thus, since the GPGPU memory (HBM) effectively has a maximum capacity, and further since all or a portion of another memory cannot be used as an extension of the GPGPU memory (HBM) to provide additional very fast memory capacity, there is a need to increase the capacity of the GPGPU memory.

SUMMARY OF THE INVENTION

The present invention increases the very fast maximum capacity of the memory on a GPGPU module. The present invention includes a processing system that has at least one external memory, and at least one general-purpose graphic processor unit (GPGPU) coupled to the at least one external memory. Each of the at least one GPGPU has a core, a cache coupled to the core, and a local memory coupled to the core. A GPGPU of the at least one GPGPU requires a first time to access data stored in the cache of the GPGPU, a second time longer than the first time to access data stored in the local memory of the GPGPU, and a third time longer than the second time to access data stored in an external memory of the at least one external memory. The GPGPU moves data from the local memory of the GPGPU to the external memory when the data in the local memory has been accessed less than a threshold number of times during a period of time, and from the external memory to the local memory of the GPGPU when the data in the external memory has been accessed more than a threshold number of times during the period of time. Each of the at least one external memory stores only GPGPU program instructions and values.

The present invention further includes a method of operating a processing system. The method includes requiring a first time to access data stored in a cache of a general-purpose graphic processor unit (GPGPU) of at least one GPGPU, a second time longer than the first time to access data stored in a local memory of the GPGPU, and a third time longer than the second time to access data stored in an external memory of at least one external memory. The method also includes moving data from the local memory of the GPGPU to the external memory when the data in the local memory has been accessed less than a threshold number of times during a period of time, and from the external memory to the local memory of the GPGPU when the data in the external memory has been accessed more than a threshold number of times during the period of time. Each of the at least one external memory storing only GPGPU program instructions and values.

The present invention also includes a non-transitory computer-readable storage medium that has embedded therein program instructions, which when executed by one or more processors of a device, causes the device to execute a method that operates a processing system. The method includes requiring a first time to access data stored in a cache of a general-purpose graphic processor unit (GPGPU) of at least one GPGPU, a second time longer than the first time to access data stored in a local memory of the GPGPU, and a third time longer than the second time to access data stored in an external memory of at least one external memory. The method also includes moving data from the local memory of the GPGPU to the external memory when the data in the local memory has been accessed less than a threshold number of times during a period of time, and from the external memory to the local memory of the GPGPU when the data in the external memory has been accessed more than a threshold number of times during the period of time. Each of the at least one external memory storing only GPGPU program instructions and values.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application and do not constitute limitations on the present application.

DETAILED DESCRIPTION OF THE INVENTION

Figure 1:
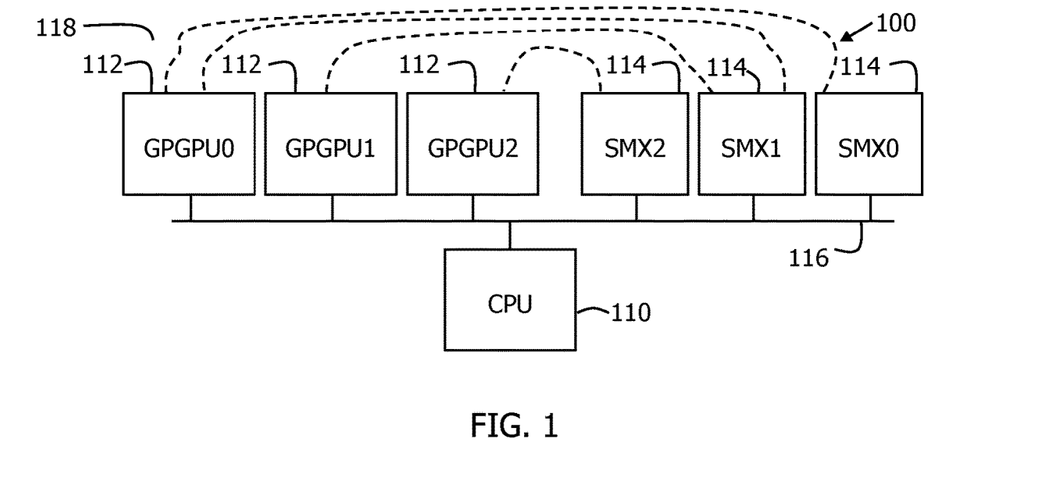
FIG. 1 is a block diagram illustrating an example of a processing system 100 in accordance with the present invention.

FIG. 1 shows a block diagram that illustrates an example of a processing system 100 in accordance with the present invention. As described in greater detail below, processing system 100, which requires a very large and very fast memory, increases the maximum capacity of the very fast memory by adding a memory resource that is too slow to meet the requirements, and then moving infrequently accessed data from the very fast memory to the memory resource with the slow access times.

As shown in FIG. 1, processing system 100 includes a central processing unit (CPU) module 110, a number of general-purpose graphics processing unit (GPGPU) modules 112, and a number of external memory (SMX) modules 114. In the present example, one CPU module, three GPGPU modules, and three SMX modules are illustrated for simplicity. Other numbers of CPU modules, GPGPU modules, and SMX modules can be utilized and arbitrarily configured.

As further shown in the FIG. 1 example, processing system 100 also includes a peripheral component interconnect express (PCIe) bus 116 that couples together CPU module 110, the GPGPU modules 112, and the SMX modules 114. PCIe bus 116 includes a number of endpoints and a root complex, and can optionally include a number of PCIe switches.

In the present example, the GPGPU modules 112 and the SMX modules 114 are endpoints when receiving data, while the root complex, which is a discrete circuit on CPU module 110, performs address translation to identify one of the endpoints. In addition, when a PCIe switch is utilized, two or more endpoints can be coupled to the switch, which is coupled to the root complex. A PCIe switch allows messages between devices that are coupled to the same PCIe switch to be directly forwarded without having to go through the root complex.

Further, rather than utilizing PCIe bus 116, a number of direct connections 118, such as dedicated data links, can alternately be utilized. In this case, each GPGPU module 112 has a direct connection to one or more SMX modules 114. While faster than a PCIe bus, particularly when a large number of devices are coupled to and accessing the PCIe bus, a dedicated data link still adds substantial latency to a memory access performed over the dedicated data link.

As a result, memory access requests over a dedicated data link are still too slow to satisfy many very fast memory access requirements. Although pairing a SMX module 114 with a GPGPU module 112 via link 118 provides better bandwidth performance, pairing is not required. The GPGPU modules 112 and the SMX modules 114 can be coupled together in a number of ways.

For example, each of the SMX modules 114 can be mapped to multiple GPGPU modules 112. In addition, multiple SMX modules 114 can be mapped to a single GPGPU module 112. Further, six GPGPU modules 112 and two SMX modules 114 can be utilized where some GPGPU modules 112 are not paired, but can still access the SMX modules 114 through the upper-level switch or the root complex.

Figure 2:
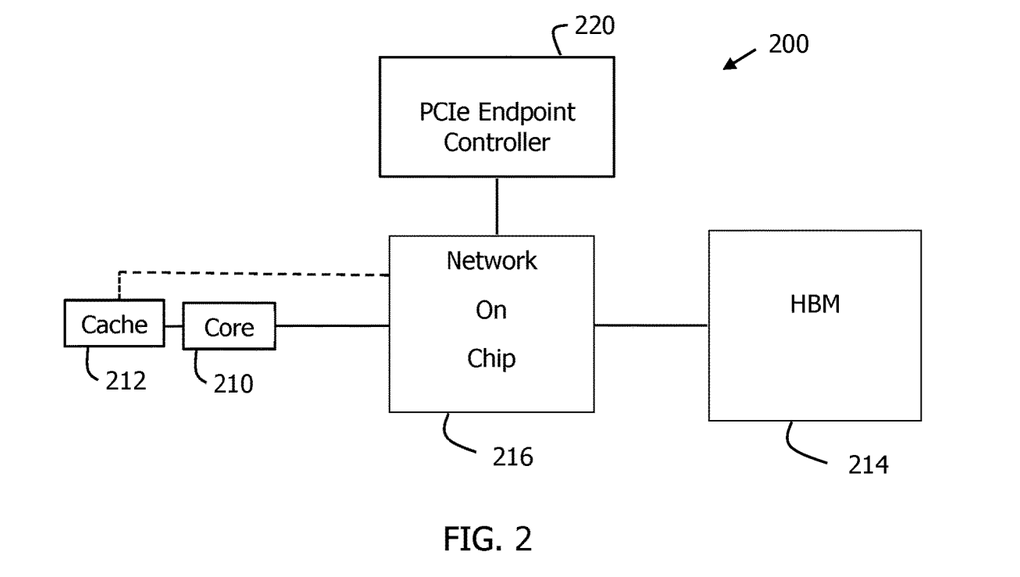
FIG. 2 is a block diagram illustrating an example of a general-purpose graphics processing unit (GPGPU) module 200 in accordance with the present invention.

FIG. 2 shows a block diagram that illustrates an example of a general-purpose graphics processing unit (GPGPU) module 200 in accordance with the present invention. In the present example, each GPGPU module 112 can be implemented with GPGPU module 200. As shown in FIG. 2, GPGPU module 200 includes a core 210, a local cache 212 (with one or more levels) that is coupled to core 210, and a local memory 214 that is coupled to core 210 and cache 212.

To meet artificial intelligence (AI) and machine learning requirements, local memory 214 is large, e.g., multi-gigabyte, and very fast. Local memory 214 stores data frequently accessed by core 210. Cache 212 stores a copy of some of the more frequently accessed data that is stored in local memory 214. Core 210, in turn, executes instructions that are stored in cache 212 and local memory 214. Core 210 requires a first time to access data stored in cache 212, and a second time longer than the first time to access data stored in local memory 214.

In one example, local memory 214 is implemented as a high bandwidth memory (HBM) that includes a number of dynamic random-access memory (DRAM) dies that are vertically stacked on top of each other to provide a large storage capacity with a small form factor. HBMs can have, for example, maximum capacities of 4 GB, 24 GB, and 64 GB. In addition, each die in a HBM has two 128-bit data channels per die to provide a high bandwidth.

GPGPU module 200 also includes a network-on-chip (NoC) 216 that couples together core 210 and local memory 214 to provide a high bandwidth, high-speed communication path between core 210 and local memory 214. Cache 212 can also be coupled to local memory 214 via NoC 216. GPGPU module 200 further includes a PCIe endpoint controller 220 that is coupled to core 210 via NoC 216 to provide communication over a PCIe bus, such as PCIe bus 116.

Core 210 executes instructions stored in cache 212/memory 214, which includes start up instructions as well as program instructions and values of an application. The program instructions frequently access some values stored in cache 212/memory 214, and infrequently access other values stored in memory 214. Further, the instructions often generate values which, after being stored in memory 214, are frequently accessed in some cases and infrequently accessed in other cases.

In operation, GPGPU module 200 moves data from local memory 214 to a SMX module when the data in local memory 214 has been accessed less than a threshold number of times during a period of time, and from the SMX module to local memory 214 when the data in the SMX module has been accessed more than a threshold number of times during the period of time.

Figure 3:
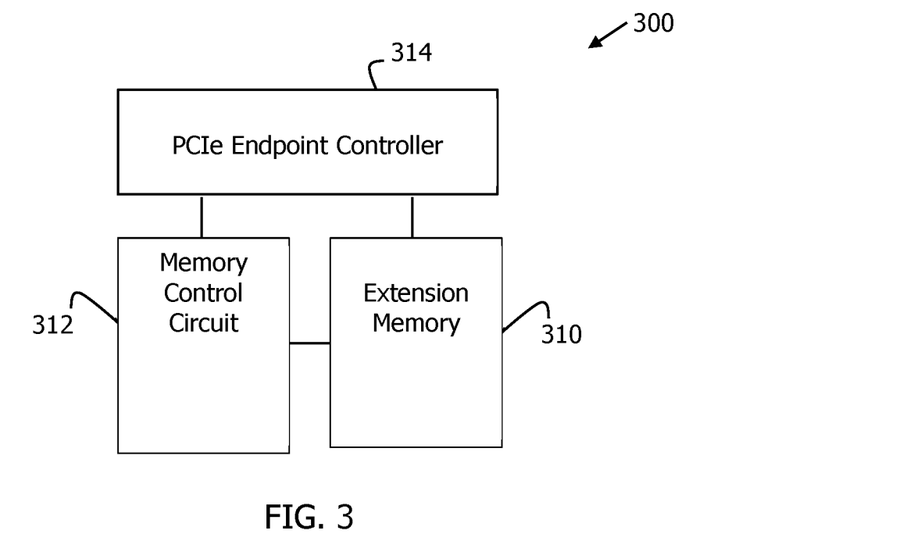
FIG. 3 is a block illustrating an example of an external memory (SMX) module 300 in accordance with the present invention.

FIG. 3 shows a block diagram that illustrates an example of an external memory (SMX) module 300 in accordance with the present invention. In the present example, each SMX module 114 can be implemented with SMX module 300. As shown in FIG. 3, SMX module 300 includes an extension memory 310 that stores data, a memory control circuit 312 that is coupled to extension memory 310 to control the movement of data into and out of memory 310, and a PCIe endpoint controller 314 that is coupled to extension memory 310 and memory control circuit 312 to control the communication over a PCIe bus, such as PCIe bus 116. Extension memory 310 stores data infrequently accessed by the core of the GPGPU, and only stores GPGPU program instructions and values. In addition, SMX module 300 has registers that store device information, such as bandwidth and access times.

SMX module 300 is accessed by way of a PCIe bus or a PCIe switch, which adds a significant latency to the memory access times of extension memory 310. As a result, a remote access of extension memory 310 is slower than accessing local (HBM) memory 214 even when extension memory 310 is implemented with a very fast memory, such as a HBM-type memory. Core 210 requires a third time longer than the second time noted above to access data stored in a SMX module.

In operation, CPU module 110 initially loads GPGPU program instructions and values into the fast local memory 214 of a GPGPU module, and then moves the GPGPU program instructions and values to the slow extension memory 310 of a SMX module when the instructions and values get cold (less or infrequently used). Alternately, CPU module 110 can load a first number of program instructions and values for an application into local memory 214 of the GPGPU module, and a second number of program instructions and values for the application into slow extension memory 310 of the SMX module before the application is executed. Local memory 214 of the GPGPU module and extension memory 310 of the SMX module store no program instructions and values for the application prior to CPU module 110 loading the first and second number of program instructions.

Figure 4:
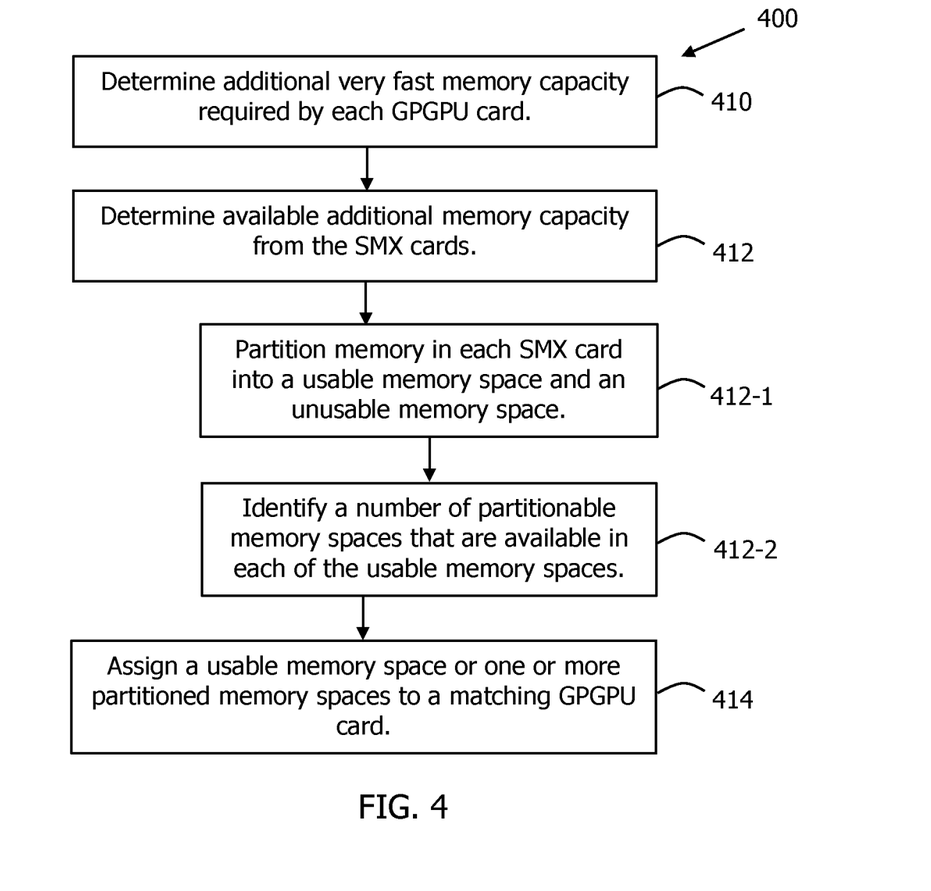
FIG. 4 is a flow chart illustrating an example of a method 400 of configuring processing system 100 in accordance with the present invention.

FIG. 4 shows a flow chart that illustrates an example of a method 400 of configuring processing system 100 in accordance with the present invention. As shown in FIG. 4, method 400 begins at 410 by determining the additional very fast memory capacity required by each GPGPU module 112/200. In some cases, each GPGPU module 112/200 requires or is assumed to require the same amount of additional very fast memory capacity, whereas in other cases the GPGPU modules 112/200 can require different amounts of additional very fast memory capacity.

Following this, method 400 moves to 412 to determine what additional memory capacity is available from the SMX modules 114/300. SMX module 300 has registers that store device information, such as capacity, bandwidth, and access times. To determine availability, method 400 moves to 412-1 to first partition the extension memory 310 on each SMX module 300 into a usable memory space and an unusable memory space.

Next, method 400 moves to 412-2 to identify a number of partitionable memory spaces that are available in each of the usable memory spaces. For example, a usable memory space of 64 GB can be partitionable into two partitioned memory spaces of 32 GB or four partitioned memory spaces of 16 GB.

After this, method 400 moves to 414 to assign a usable memory space and/or one or more partitioned memory spaces of the extension memory 310 of a SMX module 114/300 to a GPGPU module that has a matching requirement. For example, if a SMX module has a usable memory space that matches the required additional very fast memory space of a GPGPU module, then the SMX module is assigned to the GPGPU module.

If a SMX module has a usable memory space that is partitionable into two partitioned memory spaces, which match the required additional very fast memory spaces of two GPGPU modules, then one partitioned memory space on the SMX module is assigned to the first GPGPU module, while the other partitioned memory space on the SMX module is assigned to the second GPGPU module.

The configuration input can be done via the programmable interfaces of drivers or a configuration file. For example, in a user agnostic case, an API and file can contain information such as memory extension capacity, bandwidth, and access time requirements for the GPGPU. The driver determines how to partition/assign memory extension the best based on the physical device registers, as well as link topology. Depending on user soft/hard requirements, the driver can fail and feedback. The configuration can be done both statically before the system is to be used, or dynamically on the fly.

Figure 5:
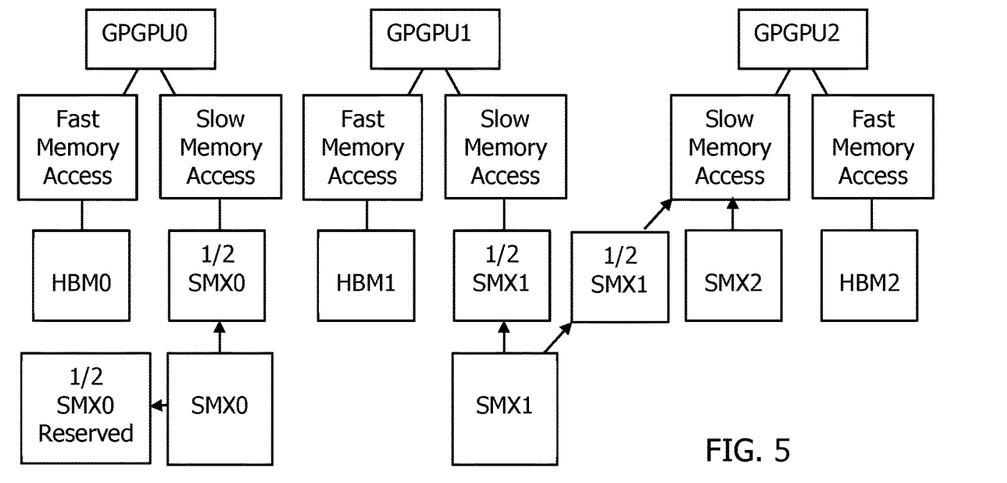
FIG. 5 is a block diagram illustrating an example of the partitioning and assigning of memory in processing system 100 in accordance with the present invention.

FIG. 5 shows a block diagram that illustrates an example of the partitioning and assigning of memory in processing system 100 in accordance with the present invention. As shown in FIG. 5, the usable memory space in SMX module SMX0 is partitioned in two, with a first half being unusable (reserved) and a second half being assigned to GPGPU module GPGPU0. Thus, GPGPU0 has fast memory access to HBM0 to read and write data, and slow memory access to ½ of the usable memory space in SMX0 to read and write data.

The usable memory space in SMX module SMX1 is also partitioned in two, with a first half being assigned to GPGPU module GPGPU1 and a second half being assigned to GPGPU module GPGPU2. Thus, GPGPU1 has fast memory access to HBM1 to read and write data, and slow memory access to ½ of the usable memory space in SMX1 to read and write data, while GPGPU2 has slow memory access to ½ of the usable memory space in SMX1. Further, the usable memory space in SMX module SMX2 is not partitioned, but is also assigned to GPGPU2, which obtains additional memory space from two SMX modules.

Figure 6:
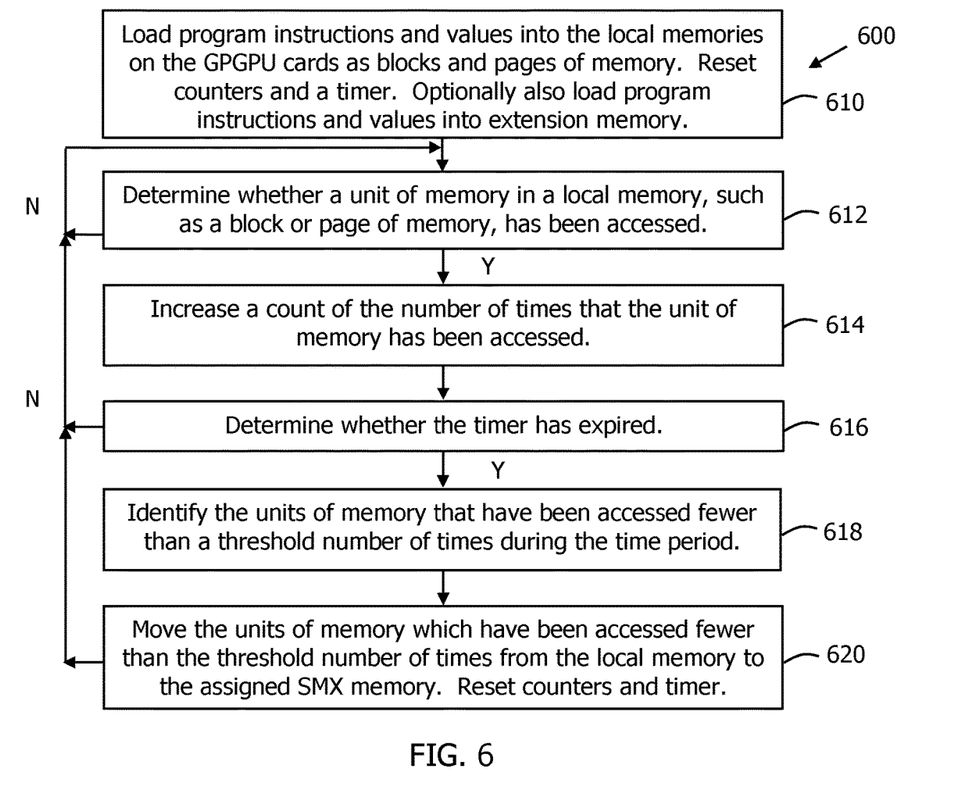
FIG. 6 is a flow chart illustrating an example of a method 600 of operating a GPGPU in accordance with the present invention.

FIG. 6 shows a flow chart that illustrates an example of a method 600 of operating a GPGPU in accordance with the present invention. As shown in FIG. 6, method 600 begins at 610 by loading program instructions and values into the local memories on the GPGPU modules as blocks and pages of memory. In addition, method 600 also resets a number of counters and a timer that measures a predetermined time period.

Method 600 then moves to 612 to determine whether a unit of memory in a local memory, such as a block or page of memory, has been accessed. Each unit of memory has an associated counter, which was reset in the previous block. When a unit of memory has been accessed, method 600 moves to 614 to increase a count held by the counter of the number of times that the unit of memory has been accessed, and then moves to 616 to determine whether a predetermined time period has expired.

When the predetermined time period has expired, method 600 moves to 618 to identify the units of memory which have been accessed fewer than a threshold number of times during the predetermined time period. Following this, method 600 moves to 620 to move the units of memory which have been accessed fewer than the threshold number of times from the local memory (214) to the extension memory (310) on the assigned SMX module. After the units of memory have been moved, method 600 resets the counter and timer and returns to 612 to again determine whether a memory access has occurred.

Any copies of the units of memory that are made as part of moving the data to the extension memory 310 on the assigned SMX module are removed (e.g., overwritten, pointer deleted) such that after the units of memory have been moved to the extension memory 310 on the assigned SMX module and remain only in the extension memory 310 on the assigned SMX module, no copy of the data stored in the slow-access extension memory 310 is stored in cache 212 or the fast-access local memory 214.

Thus, by moving the units of data that are infrequently accessed (less than the threshold number) out of the fast-access local memory (HBM), which meets the system requirements for very fast memory access times, to the slower-access extension memory of the assigned SMX module, which fails to meet the system requirements for remote memory access times, the present invention effectively increases the memory capacity of the fast-access local memory (HBM).

Infrequent access to the slower-access extension memory of the assigned SMX module still carries a substantial time penalty. However, the occasional need to obtain data from the slower-access extension memory of the assigned SMX module is tolerable as long as the frequency of occurrence is low enough.

With further respect to loading data in 610, GPGPU program instructions and values that a developer knows ahead of time is going to be infrequently accessed can be tagged, identified, and alternately loaded into the slower-access extension memory of the assigned SMX module during the same operation that loads data into the fast-access GPGPU memory (HBM). In addition, whether loaded into the fast or slow memories, data can also be tagged with a never move label to pin data to a particular memory regardless of the amount of memory accesses.

Figure 7:
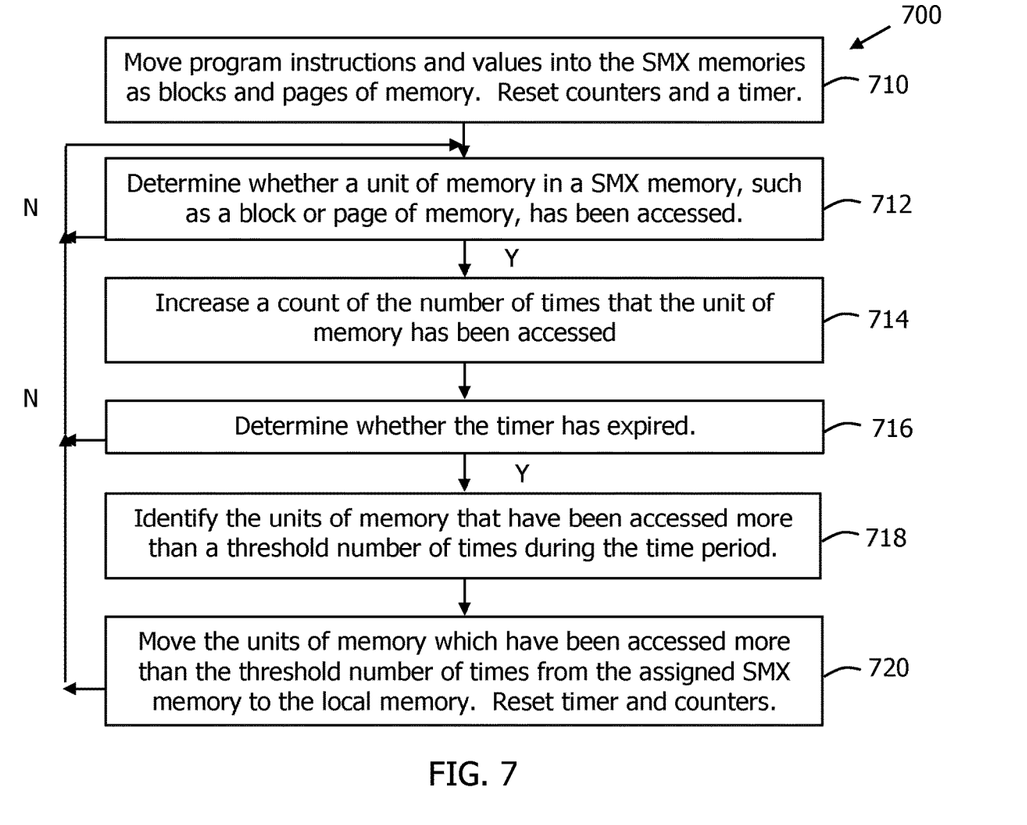
FIG. 7 is a flow chart illustrating an example of a method 700 of operating a SMX in accordance with the present invention.

FIG. 7 shows a flow chart that illustrates an example of a method 700 of operating a SMX in accordance with the present invention. As shown in FIG. 7, method 700 is similar to method 600, with the primary difference being in 718 and 720 where the units of memory which have been accessed more than a threshold number of times are identified and moved from the slower-access extension memory 310 of the assigned SMX module back to the fast-access local memory (HBM) 214 of the GPGPU module.

Accessed data, which is to be moved from the fast-access GPGPU memory (HBM) to the slower-access extension memory of the assigned SMX module, or vice versa, can first be returned to the CPU before being moved. Alternately, the accessed data can first be returned to the CPU after being moved.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims.

Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence of operations for clarity, the described sequence of operations does not necessarily dictate the order of the operations. It should be understood that some of the operations may be skipped, performed in parallel, or performed without the requirement of maintaining a strict order of sequence.

The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the various embodiments in accordance with the present disclosure can be operated in any orientation.

Some portions of the detailed descriptions may be presented in terms of procedures, logic blocks, processing, and other symbolic representations of operations on data bits within a computer memory. These descriptions and representations are used by those skilled in the data processing arts to effectively convey the substance of their work to others skilled in the art.

In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor.

The processing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above embodiments are merely used for illustrating rather than limiting the technical solutions of the present invention. Although the present application is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the scope of the technical solutions in the embodiments of the present invention.

It should be understood that the above descriptions are examples of the present invention, and that various alternatives of the invention described herein may be employed in practicing the invention. For example, the various modules can be implemented as cards. Thus, it is intended that the following claims define the scope of the invention and that structures and methods within the scope of these claims and their equivalents be covered thereby.

What is claimed is:

1. A processing system, comprising:
   at least one external memory; and
   at least one general-purpose graphic processor unit (GPGPU) coupled to the at least one external memory, each of the at least one GPGPU having a core, a cache coupled to the core, and a local memory coupled to the core, a GPGPU of the at least one GPGPU requiring a first time to access data stored in the cache of the GPGPU, a second time longer than the first time to access data stored in the local memory of the GPGPU, and a third time longer than the second time to access data stored in an external memory of the at least one external memory, wherein the GPGPU is to move data from the local memory of the GPGPU to the external memory when the data in the local memory has been accessed less than a threshold number of times during a period of time, and from the external memory to the local memory of the GPGPU when the data in the external memory has been accessed more than the threshold number of times during the period of time, and wherein each of the at least one external memory stores only GPGPU program instructions and values and the data that has been accessed less than the threshold number of times during the period of time.

2. The processing system of claim 1, wherein one of the at least one external memory maps to multiple GPGPUs.

3. The processing system of claim 1, wherein multiple external memories map to a single GPGPU.

4. The processing system of claim 1, further comprising a number of direct connections such that each GPGPU has a direct connection to one or more of the at least one external memory.

5. The processing system of claim 1, wherein the external memory is partitionable such that one or more of the at least one GPGPU are assigned a partition.

6. The processing system of claim 1, wherein the GPGPU:
   increments a count each time a unit of memory in the local memory of the GPGPU has been accessed;
   identifies units of memory in the local memory that have been accessed less than a threshold number of times during a period of time;
   moves the units of memory in the local memory which have been accessed less than the threshold number of times during the period of time from the local memory of the GPGPU to the external memory;
   determines when a unit of memory in the external memory has been accessed;
   increments a count each time the unit of memory in the external memory has been accessed;
   identifies units of memory in the external memory that have been accessed more than a threshold number of times during the period of time; and
   moves the units of memory in the external memory which have been accessed more than the threshold number of times during the period of time from the external memory to the local memory of the GPGPU.

7. The processing system of claim 1, further comprising a CPU coupled to the at least one external memory and the at least one GPGPU, wherein the CPU is to load a first plurality of program instructions for an application into the local memory of the GPGPU and a second plurality of program instructions for the application into the external memory before the application is executed, and wherein the local memory of the GPGPU and the external memory stores no program instructions for the application prior to the CPU loading the first and second plurality of program instructions.

8. A method of operating a processing system, the method comprising:
  requiring a first time to access data stored in a cache of a general-purpose graphic processor unit (GPGPU) of at least one GPGPU, a second time longer than the first time to access data stored in a local memory of the GPGPU, and a third time longer than the second time to access data stored in an external memory of at least one external memory; and
  moving data from the local memory of the GPGPU to the external memory when the data in the local memory has been accessed less than a threshold number of times during a period of time, and from the external memory to the local memory of the GPGPU when the data in the external memory has been accessed more than the threshold number of times during the period of time, wherein each of the at least one external memory stores only GPGPU program instructions and values and the data that has been accessed less than the threshold number of times during the period of time.

9. The method of claim 8, wherein one of the at least one external memory maps to multiple GPGPUs.

10. The method of claim 8, wherein multiple external memories map to a single GPGPU.

11. The method of claim 8, further comprising directly connecting each GPGPU to one or more of the at least one external memory.

12. The method of claim 8, further comprising partitioning the external memory such that one or more of the at least one GPGPU are assigned a partition.

13. The method of claim 8, further comprising:
  incrementing a count each time a unit of memory in the local memory of the GPGPU has been accessed;
  identifying units of memory in the local memory that have been accessed less than a threshold number of times during a period of time;
  moving the units of memory in the local memory which have been accessed less than the threshold number of times during the period of time from the local memory of the GPGPU to the external memory;
  determining when a unit of memory in the external memory has been accessed;
  incrementing a count each time a unit of memory in the external memory has been accessed;
  identifying units of memory in the external memory that have been accessed more than a threshold number of times during the period of time; and
  moving the units of memory in the external memory which have been accessed more than the threshold number of times during the period of time from the external memory to the local memory of the GPGPU.

14. The method of claim 8, further comprising loading a first plurality of program instructions for an application into the local memory of the GPGPU and a second plurality of program instructions for the application into the external memory before the application is executed, wherein the local memory of the GPGPU and the external memory stores no program instructions for the application prior to a CPU loading the first and second plurality of program instructions.

15. A non-transitory computer-readable storage medium having embedded therein program instructions, which when executed by one or more processors of a device, causes the device to execute a method that operates a processing system, the method comprising:
  requiring a first time to access data stored in a cache of a general-purpose graphic processor unit (GPGPU) of at least one GPGPU, a second time longer than the first time to access data stored in a local memory of the GPGPU, and a third time longer than the second time to access data stored in an external memory of at least one external memory; and
  moving data from the local memory of the GPGPU to the external memory when the data in the local memory has been accessed less than a threshold number of times during a period of time, and from the external memory to the local memory of the GPGPU when the data in the external memory has been accessed more than the threshold number of times during the period of time, wherein each of the at least one external memory stores only GPGPU program instructions and values and the data that has been accessed less than the threshold number of times during the period of time.

16. The medium of claim 15, wherein one of the at least one external memory maps to multiple GPGPUs.

17. The medium of claim 15, wherein multiple external memories map to a single GPGPU.

18. The medium of claim 15, wherein the method further comprises directly connecting each GPGPU to one or more of the at least one external memory.

19. The medium of claim 15, wherein the method further comprises partitioning the external memory such that one or more of the at least one GPGPU are assigned a partition.

20. The medium of claim 15, wherein the method further comprises loading a first plurality of program instructions for an application into the local memory of the GPGPU and a second plurality of program instructions for the application into the external memory before the application is executed, and wherein the local memory of the GPGPU and the external memory stores no program instructions for the application prior to a CPU loading the first and second plurality of program instructions.

* * * * *